April 7, 1964
P. KARLAN
3,127,663
COMBINATION BORING AND ROUTING TOOL
Filed Oct. 10, 1961
3 Sheets-Sheet 1
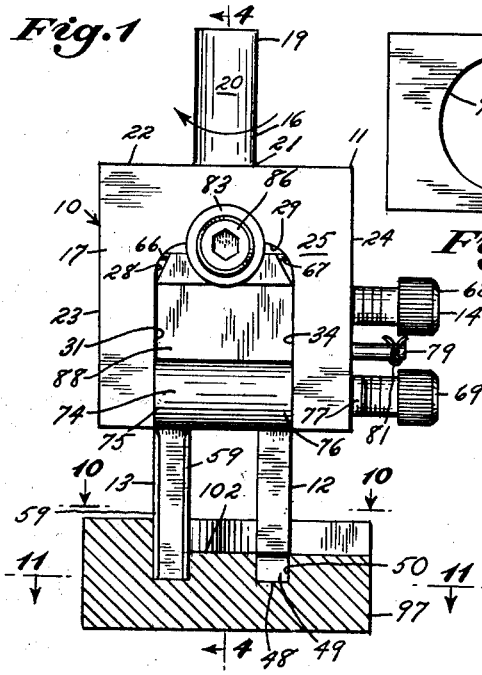

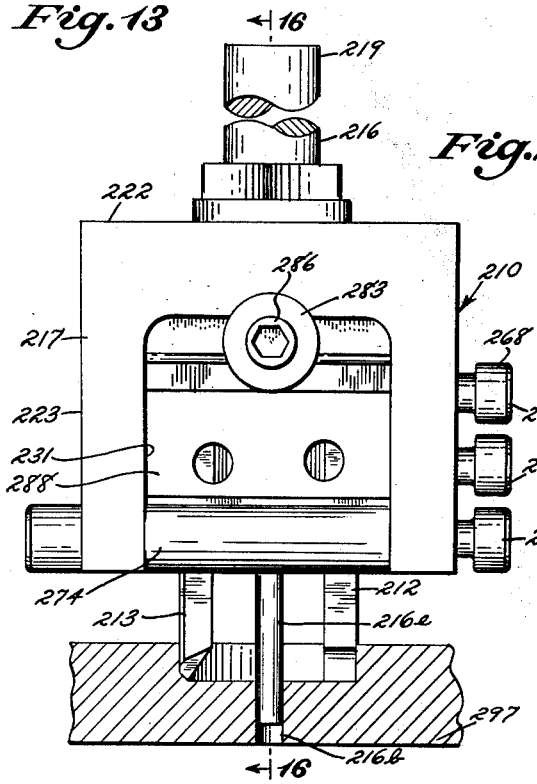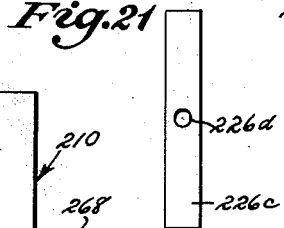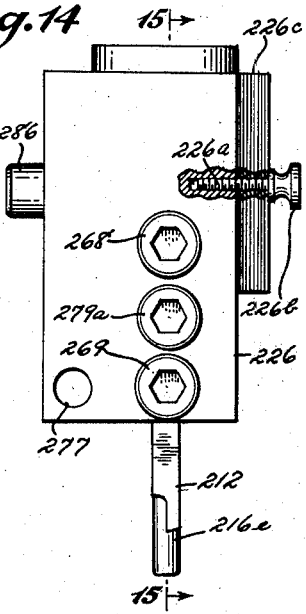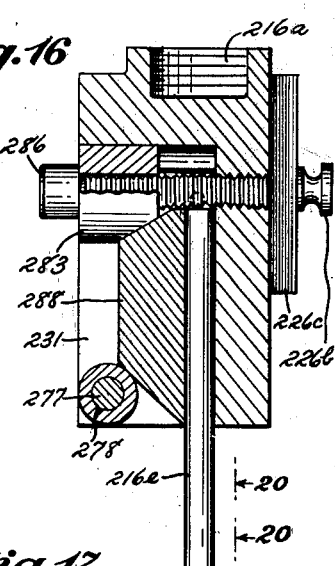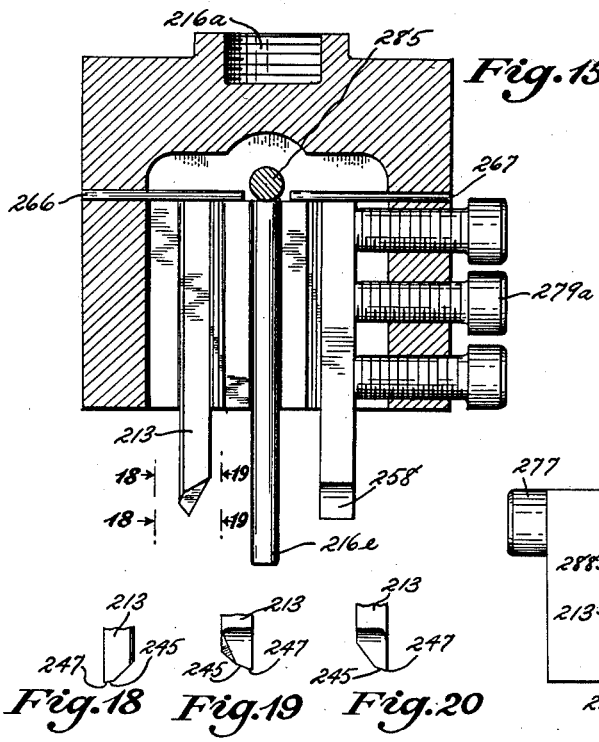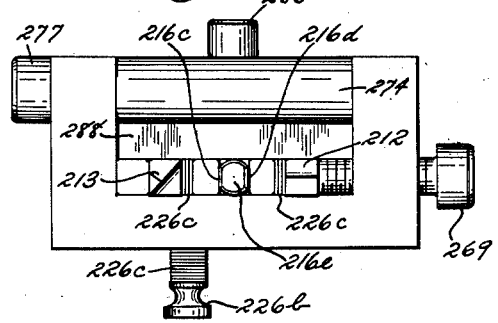

United States Patent Office 3,127,663
Patented Apr. 7, 1964

3,127,663
COMBINATION BORING AND ROUTING TOOL
Paul Karlan, 110 Stuyvesant Plaza, Mount Vernon, N.Y.
Filed Oct. 10, 1961, Ser. No. 144,268
2 Claims. (Cl. 29—105)

This application is a continuation in part of my copending application entitled Machining Tool, Serial No. 66,136, filed October 31, 1960, now abandoned.

This invention relates generally to the machine tool art, and more particularly to an improved adjustable cutter suitable for use in conjunction with both boring and routing operations with only relatively minor adjustments.

It is known in the art to provide a wide variety of milling and boring cutters adapted to perform specific machining operations of given dimensions. These cutters are relatively costly, and where the same are used only occasionally, it is difficult to justify the expensive purchase of the same. Many smaller machine shops are seriously handicapped in that it often becomes necessary to purchase cutters of fixed diameter that are difficult to resharpen without special equipment. It is among the principal objects of the present invention to provide a cutter capable of performing both routing and boring operations which may be used over a wide range of dimensions, thereby substantially reducing the inventory of cutters which must be maintained on hand at any given time.

Another object of the invention lies in the provision of an improved rotary machining cutter which may be used in conjunction with existing machine tools, as for example milling machines, boring machines, lathes and the like.

A further object of the invention lies in the provision of a cutter device of the class described which may employ conventional tool steel cutters which are readily obtainable, and which may be conveniently ground.

Still another object of the invention lies in the provision of a device of the class described in which the cutter elements may be removed for replacement to adapt the device for differing machining operations, or similar machining operations to different dimensions.

Still another object of the invention lies in the provision of a device of the class described in which the cost of fabrication may be of reasonably low order, with consequent wide sale, distribution and use.

Another object of the invention lies in the provision of cutter elements which may be conveniently resharpened or replaced when dulled.

A feature of the invention lies in the extreme rigidity and strength of the device, whereby relatively heavy machining loads may be taken.

Another feature of the invention lies in the provision of pilot guide means employed in the boring of larger holes, to result in a substantial elimination of tool chattering.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

FIGURE 1 is a fragmentary view in elevation, partly in section, of a first embodiment of the invention.

FIGURE 2 is a similar fragmentary elevational view as seen from the right-hand portion of FIGURE 1.

FIGURE 3 is a fragmentary vertical sectional view as seen from the plane 3—3 in FIGURE 2.

FIGURE 4 is a fragmentary vertical sectional view as seen from the plane 4—4 in FIGURE 1.

FIGURE 5 is a bottom plan view of the first embodiment.

FIGURE 6 is a fragmentary view in elevation as seen from the plane 6—6 in FIGURE 3.

FIGURE 7 is a fragmentary view in elevation corresponding to the lower left-hand portion of FIGURE 3.

FIGURE 8 is a fragmentary view in elevation as seen from the lower right-hand portion of FIGURE 2.

FIGURE 9 is a similar fragmentary view corresponding to the lower left-hand portion of FIGURE 1.

FIGURE 10 is a fragmentary elevational view showing a typical work piece.

FIGURE 13 is a fragmentary view in elevation, partially in section, showing a second embodiment of the invention.

FIGURE 14 is an elevational view of the second embodiment as might be seen from the right-hand portion of FIGURE 13.

FIGURE 15 is a vertical sectional view as seen from the plane 15—15 in FIGURE 14.

FIGURE 16 is a vertical sectional view as seen from the plane 16—16 in FIGURE 13.

FIGURE 17 is a bottom plan view of the second embodiment.

FIGURE 18 is a fragmentary view in elevation as seen from the plane 18—18 in FIGURE 15.

FIGURE 19 is a fragmentary elevational view as seen from the plane 19—19 in FIGURE 15.

FIGURE 20 is a fragmentary elevational view as seen from the plane 20—20 in FIGURE 16.

FIGURE 21 is a plan view of a spacer member which may be used with either the first or second embodiment.

Figure 11:
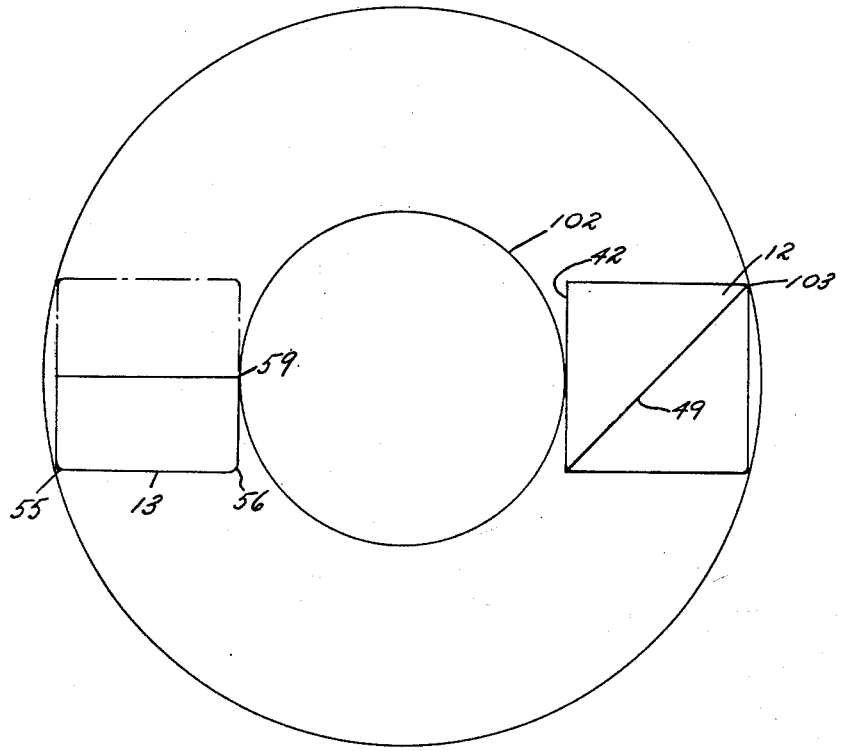
FIGURE 11 is an enlarged transverse sectional view as seen from the plane 11—11 in FIGURE 1.

In accordance with the first embodiment of the invention, the device, generally indicated by reference character 10, comprises broadly: a frame element 11, a first cutter element 12, a second cutter element 13, and cutter-retaining means 14.

The frame element 11 is preferably formed from steel, and includes a cylindrical machine-engaging member 16 and a rectangular frame member 17.

The cylindrical member 16 is bounded by an upper end 19, and a cylindrical outer surface 20, preferably being joined to the rectangular frame member 17 by a fillet 21 at the upper surface 22 thereof. The frame member 17 is also bounded by side surfaces 23 and 24, a forward surface 25, a rear surface 26, and a lower surface 27. Extending inwardly from the front surface 25 and lower surface 27 is a generally rectangularly shaped recess 28. The recess 28 is bounded by an upper wall 29, an inner end wall 30 as well as inner side walls 31 and 32 which form a lower opening 33 and a continuous front opening 34.

The first cutter element 12 is preferably formed from tool steel and is of generally elongated configuration, including an inner end 40, an outer end 41, and a plurality of side surfaces 42. The cutting portion thereof includes a lower face 45 angularly disposed with respect to the principal axis of the element 12 to afford relief which extends from the point 46 to the point 47 forming a lateral cutting edge 48. A longitudinally disposed face 49 meets with a side surface 42 to form a longitudinal cutting edge 50. From a consideration of FIGURE 1, it will be apparent that the edges 48 and 50 permit cutting in both an axial and a lateral direction as the frame element is rotated.

The second cutter element 13 is made of generally similar material, and is also generally elongated in configuration. It includes an inner end 53, side surfaces 54, and a pair of longitudinal beveled surfaces 55 and 56. A lower surface 57 is angularly disposed to provide a degree of relief, a longitudinal face 58 meeting with one of the side surfaces 54 forming cutting edges 59.

The cutter-retaining means 14 includes a pair of cutter-positioning pins 66 and 67 (best seen in FIGURE 3) which extend into the recess 28. A pair of cutter-compressing bolts 68 and 69 are threadedly engaged within corresponding bores 70 and 71, the inner ends 72 of which are adapted to extend into the relatively lower portion 73 of the recess 28. Disposed adjacent the bolt 69 is a hollow cylindrical member 74, the ends 75 and 76 of which contact the inner side walls 31 and 32. A bolt 77 extends through the bore 78 of the member 74 to maintain the member 74 in the position shown in FIGURES 4 and 5.

Disposed between the bolts 68 and 69 is a plunger member 79 urged resiliently inwardly with respect to the recess 28 by a small coil spring (not shown). A cotter key 81 limits inward movement of the inner end 82 within the recess 28, the plunger member serving to retain the cutter elements 12 and 13 within the recess prior to the tightening of the bolts 68 and 69 thereagainst.

At the upper end of the recess 28 is a threaded bore 85 engaged by a bolt 86, the latter maintaining a beveled washer 87 against a rectangularly-shaped wedge member 88. As best seen in FIGURE 4, the wedge member includes a pair of inclined surfaces 89 and 90, the latter of which engages the outer surface of the member 74 to press against the cutter elements 12 and 13, and assist in maintaining the same in proper position. The surface 89 is engaged by a corresponding surface 91 on the washer 87, and force exerted by the bolt 86 is transmitted therethrough. As will be understood from a consideration of FIGURE 4, the reaction of the forces on the surfaces 89 and 90 is transmitted through the surface 93 which lies in direct contact with the cutter elements 12 and 13.

Referring to FIGURES 3 and 5, the cutter elements 12 and 13 are maintained in fixed relationship within the frame element 11 by spacer members, two of which are indicated by reference characters 94 and 95. Depending upon the operation involved, the cutter elements will be normally disposed on either side of the principal axis of the frame element passing through the member 16, the cutter element 12 machining the inner surface of the bore being created while the cutter element 13 cuts the plug which will be formed between the elements 12 and 13.

As shown in the drawings, the cutter elements 12 and 13 are spaced equidistant from the axis of the member 16, although this distance may be varied by using spacers of varying thickness (see FIGURE 21). Where the diameter of the bore to be machined is less than the width of the rectangular recess 28, some of the spacers may be placed to contact the inner side wall 31.

Referring to FIGURE 10 in the drawing, there is illustrated an example of two types of machining operations which may be performed using the device 10. The work, generally indicated by reference character 97, has been machined to include a cylindrical bore 98 and a generally rectilinear channel or groove 99 which has been obtained by first machining at least part of the bore 98, and then moving the work 97 at right angles to the axis of the member 16, a movement which may be obtained in many types of machine tools. After the center plug 102 has been removed during the lateral movement, it is preferable to replace cutter element 13 by another cutter element similar to the first cutter element 12, since all of the cutting will be on the outer periphery of the path of travel described by the rotating cutters.

Turning now to FIGURE 11, it will be observed that the first cutter element 12 may be provided with a rounded longitudinal edge 103 to eliminate the possibility of rubbing and distorting the finished surface of the bore 98. As the face 49 clears the plug 102, the plug will also clear the adjacent side surface 42. In a similar manner, the cutter element 13 has only theoretical line contact with the plug 102, precisely at the inner edge 59. In the position shown in FIGURE 11, the cutter elements 12 and 13 are arranged for clockwise rotation, and the necessity of resharpening tools may be postponed by rotating each of the tools through 180° and repositioning the same wherein the opposed cutting edges are exposed, provided that the frame element 11 is then rotated in a counterclockwise direction.

Figure 12:
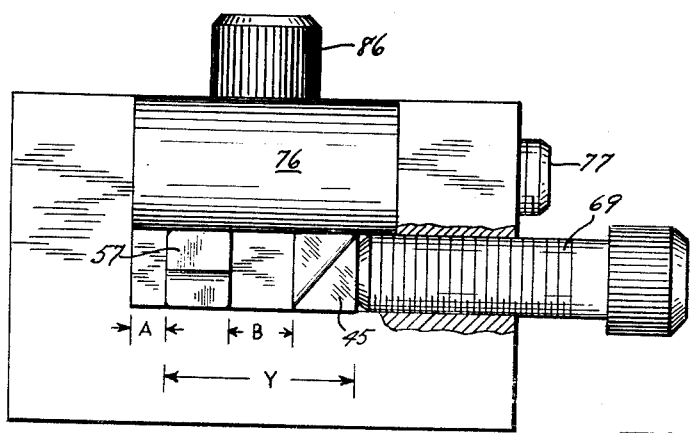
FIGURE 12 is an enlarged bottom plan view, corresponding to that seen in FIGURE 5, but showing certain of the component parts in altered relative position.

With reference to FIGURE 12, the following discussion is directed toward the computing of the thickness of the spacers employed where a bore is being machined which is less than the limit of capacity of the frame element. As seen in FIGURE 12, it is essential that the cutter elements be substantially equally spaced from the longitudinal axis of the device, and this may be accomplished by use of two spacers designated $(a)$ and $(b)$, the bolts 68 and 69 being tightened to eliminate the necessity of a spacer opposite spacer $(a)$.

Assuming a width between the walls 31 and 32 of one inch, D to represent the desired diameter, and Y to represent the width of the cutter elements 12 and 13 plus the width of the spacer $(b)$, using cutter elements having a cross section ¼ inch square, the following relation is established:

(1) $\quad Y^2 + (¼)^2 = D^2$
(2) $\quad Y^2 = D^2 - \frac{1}{16}$
(3) $\quad Y = \sqrt{[D^2 - \frac{1}{16}]}$
(4) $\quad Y = (b) + ½$
(5) $\quad (b) + ½ = \sqrt{[D^2 - \frac{1}{16}]}$
(6) $\quad (b) = \sqrt{[D^2 - \frac{1}{16}]} - ½$ Once the desired diameter (D) is determined, the width of spacer $(b)$ may be found by substituting the value D in Equation 6.

The determination of spacer $(a)$ is derived from the following equation:

(7) $\quad (a) = ½ - ¼ - (b)/2$
(8) $\quad (a) = ¼ - (b)/2$

Once the width of spacer $(b)$ has been determined from Equation 6, a substitution of this value in Equation 8 will indicate the value of the width of the spacer $(a)$.

Turning now to the second embodiment of the invention, as illustrated in FIGURES 13 through 20, inclusive, parts corresponding to those of the first embodiment have been designated by similar reference characters with the addition of the prefix "2." The second embodiment differs from the first embodiment principally in minor refinements, and in the provision of a pilot guide or pin coaxially aligned with the axis of rotation to be engaged within a predrilled bore in the work piece, whereby the tool may be steadied in boring operations.

The cylindrical member 216 is threadedly engaged within a bore 216a in the frame element 211, permitting the frame element 211 to be case-hardened for greater strength, and permitting heavier cuts. The plunger member 79 of the first embodiment is replaced by a third cutter-compressing bolt 279a. Disposed on surface 226 is a threaded bore 226a engaged by a bolt 226b and supporting a plurality of spacers 226c of varying thickness when such spacers are not in use. The spacers 226 are provided with a bore 226d (see FIGURE 21) through which the bolt 226b extends (see FIGURE 14).

Disposed centrally and coaxially with respect to the axis of the cylindrical member 216 is a guiding or pilot pin 216e, which during use engages a correspondingly predrilled pilot hole 216b in the work piece 297 (see FIGURE 13). To facilitate clamping, flat surfaces 216c and 216d are provided, which are contacted by one of the spacers 226c on either side to be rigidly held thereby upon the tightening of the bolts 268, 269 and 279a. In this manner the device 210 is supported at both ends as it performs its cutting operation, and vibration and tool chatter are reduced to a minimum.

I wish it to be understood that I do not consider the invention limited to the precise details of structure shown and set forth in this specification, for obvious modifications will occur to those skilled in the art to which the invention pertains.

I claim:

1. In a machining tool holder, a frame element, machine-engaging means disposed upon said frame element, said machine-engaging means having a principal axis, there being a generally rectangularly-shaped recess in said frame element, having a principal axial plane parallel to the principal axis of said machine-engaging means, a plurality of elongated cutting tools each having a principal axis and a generally rectangularly-shaped cross section, said cutting tools being positioned within said recess in substantially mutually parallel relation, a plurality of elongated spacer members of varying thickness and of rectangular cross section selectively disposed within said recess and substantially filling the remaining volume of said recess, and means for exerting a compressive force upon an exposed surface of each of said plurality of tools and spacer members, said means including a bolt threadedly engaged upon said frame element and having a principal axis perpendicular to said principal plane of said recess, a washer having a beveled surface slidably disposed upon said bolt, a generally cylindrically-shaped member attached to said frame element having a principal axis disposed parallel to the principal plane of said recess, and having an outer surface thereon, a generally rectangularly-shaped wedge member having a pair of oppositely disposed wedge surfaces and a planar surface therebetween, said planar surface contacting surfaces of said tool and spacer members, one of said wedge surfaces contacting said cylindrically-shaped member, and the other of said wedge surfaces contacting said beveled surface of said washer; whereby tightening of said bolt may serve to compress said planar surface of said wedge member against said cutting tools and spacer members.

2. In a machining tool holder, a frame element, machine-engaging means disposed upon said frame element, said machine-engaging means having a principal axis, there being a generally rectangularly-shaped recess in said frame element, having a principal axial plane parallel to the principal axis of said machine-engaging means, a plurality of elongated cutting tools each having a principal axis and a generally rectangularly-shaped cross section, said cutting tools being positioned within said recess in substantially mutually parallel relation, a plurality of elongated spacer members of varying thickness and of rectangular cross section selectively disposed within said recess, and means for exerting a compressive force upon an exposed surface of each of said plurality of tools and spacer members, said means including a bolt threadedly engaged upon said frame element and having a principal axis perpendicular to said principal plane of said recess, a washer having a beveled surface slidably disposed upon said bolt, a generally cylindrically-shaped member attached to said frame element having a principal axis disposed parallel to the principal plane of said recess, and having an outer surface thereon, a generally rectangularly-shaped wedge member, having a trapezoidal cross section and having a pair of oppositely disposed wedge surfaces and a planar surface therebetween, said planar surface contacting surfaces of said tool and spacer members, one of said wedge surfaces contacting said cylindrically-shaped member, and the other of said wedge surfaces contacting said beveled surface of said washer; whereby tightening of said bolt may serve to compress said planar surface of said wedge member against said cutting tools and spacer members.

References Cited in the file of this patent

UNITED STATES PATENTS

| | | |
|---|---|---|
| 373,126 | Burger | Nov. 15, 1887 |
| 1,823,218 | Swanson | Sept. 15, 1931 |
| 2,363,160 | Sundstrom | Nov. 21, 1944 |
| 2,468,562 | Lank | Apr. 26, 1949 |
| 2,861,322 | Benes et al. | Nov. 25, 1958 |

FOREIGN PATENTS

| | | |
|---|---|---|
| 21,492 | Great Britain | Oct. 6, 1904 |